United States Patent
Armstrong et al.

(10) Patent No.: US 6,861,038 B2
(45) Date of Patent: Mar. 1, 2005

(54) CERAMICS AND METHOD OF PRODUCING CERAMICS

(75) Inventors: Donn Reynolds Armstrong, Lisle, IL (US); Stanley S. Borys, Elmhurst, IL (US); Richard Paul Anderson, Clarendon Hills, IL (US)

(73) Assignee: International Titanium Powder, LLC., Lockport, IL (US)

( * ) Notice: Subject to any disclaimer, the term of this patent is extended or adjusted under 35 U.S.C. 154(b) by 0 days.

(21) Appl. No.: 10/654,464

(22) Filed: Sep. 3, 2003

(65) Prior Publication Data

US 2004/0166045 A1 Aug. 26, 2004

Related U.S. Application Data

(63) Continuation of application No. 10/238,297, filed on Sep. 10, 2002, and a continuation of application No. 10/238,791, filed on Sep. 10, 2002, which is a continuation of application No. 10/125,988, filed on Apr. 20, 2002, and a continuation of application No. 10/125,942, filed on Apr. 19, 2002, which is a continuation of application No. 09/264,577, filed on Mar. 8, 1999, now Pat. No. 6,409,797, which is a continuation-in-part of application No. 08/782,816, filed on Jan. 13, 1997, now Pat. No. 5,958,106, which is a continuation-in-part of application No. 08/691,423, filed on Aug. 2, 1996, now Pat. No. 5,779,761, which is a continuation of application No. 08/283,358, filed on Aug. 1, 1994, now abandoned.

(51) Int. Cl.$^7$ .................. C01B 35/04; C01B 31/30; C01B 31/36; C01B 21/06; C01B 21/076

(52) U.S. Cl. ............... 423/276; 423/289; 423/297; 423/324; 423/344; 423/345; 423/346; 423/351; 423/364; 423/366; 423/371; 423/409; 423/411; 423/412; 423/414; 423/439; 423/440; 423/511; 423/561.1; 423/659

(58) Field of Search .................. 423/276, 289, 423/297, 324, 344, 345, 346, 351, 364, 366, 371, 409, 411, 412, 414, 439, 440, 511, 561.1, 659

(56) References Cited

U.S. PATENT DOCUMENTS

| | | | | |
|---|---|---|---|---|
| 4,414,188 A | * | 11/1983 | Becker | 423/297 |
| 4,604,368 A | * | 8/1986 | Reeve | 501/96.3 |
| 5,779,761 A | * | 7/1998 | Armstrong et al. | 75/370 |
| 5,958,106 A | * | 9/1999 | Armstrong et al. | 75/370 |
| 6,409,797 B2 | * | 6/2002 | Armstrong et al. | 75/343 |

* cited by examiner

Primary Examiner—Wayne A. Langel
(74) Attorney, Agent, or Firm—Emrich & Dithmar LLC; Harry M. Levy

(57) ABSTRACT

A method of continuously producing a non-oxide ceramic formed of a metal constituent and a non-metal constituent. A salt of the metal constituent and a compound of the non-metal constituent and a compound of the non-metal constituent are introduced into a liquid alkali metal or a liquid alkaline earth metal or mixtures to react the constituents substantially submerged in the liquid metal to form ceramic particles. The liquid metal is present in excess of the stoichiometric amount necessary to convert the constituents into ceramic particles to absorb the heat of reaction to maintain the temperature of the ceramic particles below the sintering temperature. Ceramic particles made by the method are part of the invention.

36 Claims, 3 Drawing Sheets

CERAMICS AND METHOD OF PRODUCING CERAMICS

RELATED APPLICATIONS

This is a continuation of application Ser. No. 10/238,297 pending and application Ser. No. 10/238,791 filed Sep. 10, 2002 pending which was a continuation of application Ser. No. 10/125,988 filed Apr. 20, 2002 pending and application Ser. No. 10/125,942 filed Apr. 19, 2002, pending which were continuations of application Ser. No. 09/264,577 filed Mar. 8, 1999, U.S. Pat. No. 6,409,797 which was a continuation-in-part of application Ser. No. 08/782,816, filed Jan. 13, 1997, U.S. Pat. No. 5,958,106, which was a continuation-in-part of application Ser. No. 08/691,423, Aug. 2, 1996, U.S. Pat. No. 5,779,761, which was a continuation of application Ser. No. 08/283,358, Aug. 1, 1994, abandoned, the entire disclosures of which are incorporated by reference.

BACKGROUND OF THE INVENTION

This invention relates to the direct production of non-oxide ceramic powders of carbides, nitrides, silicides, sulfides, borides or mixtures thereof from volatile compounds in a liquid metal reactor. Particular interest exists for liquid sodium as the reacting metal and the present invention will be described with particular reference to sodium but is applicable to other alkali and alkaline earth metal reducing media. Elemental materials have been successfully made by the Armstrong Process described in U.S. Pat. Nos. 5,779,761, 5,958,106 and 6,409,797, but those patents describe the use of one or more halide feed streams, whereas the present invention is related to ceramics using different feed streams than previously disclosed. For the purposes of this invention the feedstocks include those metals that have volatile liquid compounds such as, by way of example only, the halides of titanium, tantalum, zirconium, aluminum, vanadium and silicon.

SUMMARY OF THE INVENTION

The proposed process is an innovative low-temperature approach to producing non-oxide ceramic powders. The process uses the reaction of liquid metal sodium (or other alkali or alkaline earth metal) and two or more inorganic feedstocks, mixed together and introduced through a sonic nozzle submerged in the liquid sodium, to produce sodium salts of the anions of the feedstocks and the ceramic compound of the cationic constituents of the inorganic reactants. By way of example, a representative reaction to make titanium carbide is as follows:

$$8Na+TiCl_4+CCl_4 \rightarrow TiC+8NaCl$$

The reaction products, TiC and NaCl are both solids in the temperature ranges at which the process operates and can be separated from liquid sodium by standard techniques leaving a water soluble salt and a ceramic powder. A mixed ceramic such as TiC/TiN can be made by introducing both carbon and nitrogen compounds into the sodium along with the volatile titanium compound. This may be accomplished by either a mixture of, for example, $CCl_4$ and $N_2$ or the single compound $C_2N_2$ as follows:

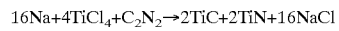
$$16Na+4TiCl_4+C_2N_2 \rightarrow 2TiC+2TiN+16NaCl$$

Using $N_2$ permits different ratios of the ceramics to be produced, while using $C_2N_2$ results in equal molar quantities of each ceramic.

Accordingly, an object of the present invention is to provide a low-temperature and continuous ceramic production process, with short residence times, eliminating the excessive energy consumption requirements of current production technology, while providing great latitude in the product produced.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
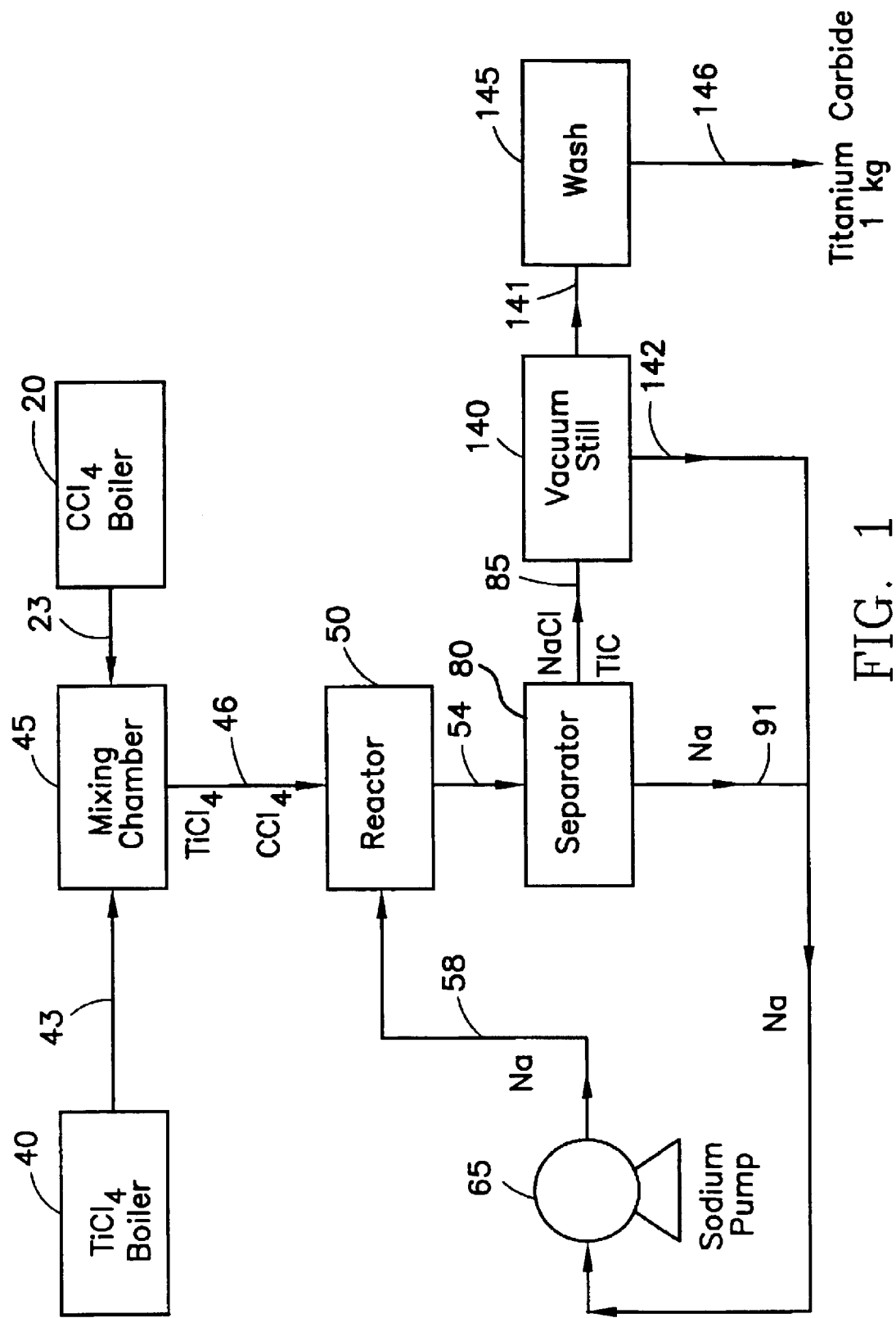
FIG. 1 is a schematic representation of a continuous process for carrying out the invention.

The liquid metal serves both as a reactant and a heat transfer medium. A quantity of each of the inorganic feeds is boiled in one or more inorganic supply tanks at a pressure greater than that required for sonic flow through the submerged injection nozzle. The mixed inorganic vapors flow through the nozzle beneath the liquid metal surface and react with the liquid metal to produce salts of the anionic parts of the feedstocks and ceramic powder. Other methods of obtaining predetermined vapor mixtures are intended to be included in this invention, the mixing chambers described above being only one.

The process begins with the injection of a vapor mixture through a sonic flow nozzle. Key to the process is the submerged reaction of the inorganic vapor in a liquid metal. The reaction process is controlled through the use of a choked-flow (sonic, or critical-flow) nozzle, described at page 5–14, of Perry's Chemical Engineers' Handbook, sixth edition, McGraw-Hill Book Company, 1984, which is incorporated herein by reference. A choke-flow nozzle is a vapor injection nozzle that achieves sonic velocity of the vapor at the nozzle throat. Then, any change in downstream conditions that causes a pressure change cannot propagate upstream to affect the discharge. The downstream pressure may then be reduced indefinitely without increasing or decreasing the discharge. Under choke-flow conditions, only the upstream conditions need to be controlled to control the flow rate. The choke-flow nozzle serves two purposes: (1) it isolates the vapor generator from the liquid metal system, precluding the possibility of liquid metal backing up into the inorganic feed system and causing potentially dangerous contact with the liquid inorganic feedstock, and (2) it delivers the vapor at a fixed rate, independent of temperature and pressure fluctuations in the reaction zone, allowing easy and absolute control of the reaction kinetics.

The liquid metal stream also has multiple functional uses: (1) it rapidly chills the reaction products, forming solid powder products (2) it transports the chilled reaction products to a separator, and (3) it serves as a heat transfer medium allowing control of the reaction temperature. A liquid metal flow rate is selected to control the temperature increase through the reactor, preferably at less than about 200° C. to about 600° C. Liquid metal containing the reaction products, for instance, sodium chloride and titanium carbide, exits the reactor and enters a separator where most of the liquid metal is removed and recycled to the reactor.

The process of the invention may be practiced with the use of any alkali metal including mixtures thereof, or alkaline earth metal including mixtures thereof depending on the feed stock to be reduced. By way of example, sodium will be chosen, not for purposes of limitation but merely for purposes of illustration, because it is cheapest and preferred. Titanium tetrachloride will be chosen by way of example as one of the reacting inorganic materials and carbon tetrachloride as the other as they are readily available. Other gases useful in the invention include the halides of Ta, Zr, Si, and Al, as well as gaseous compounds of C, B, N, and Si. Mixtures of the gases can be used to manufacture mixed ceramics, such as, by way of example TiC/TiN. Si appears as both a metal constituent and a non-metal constituent, since Si can form ceramics with metals or non-metals.

Figure 2:
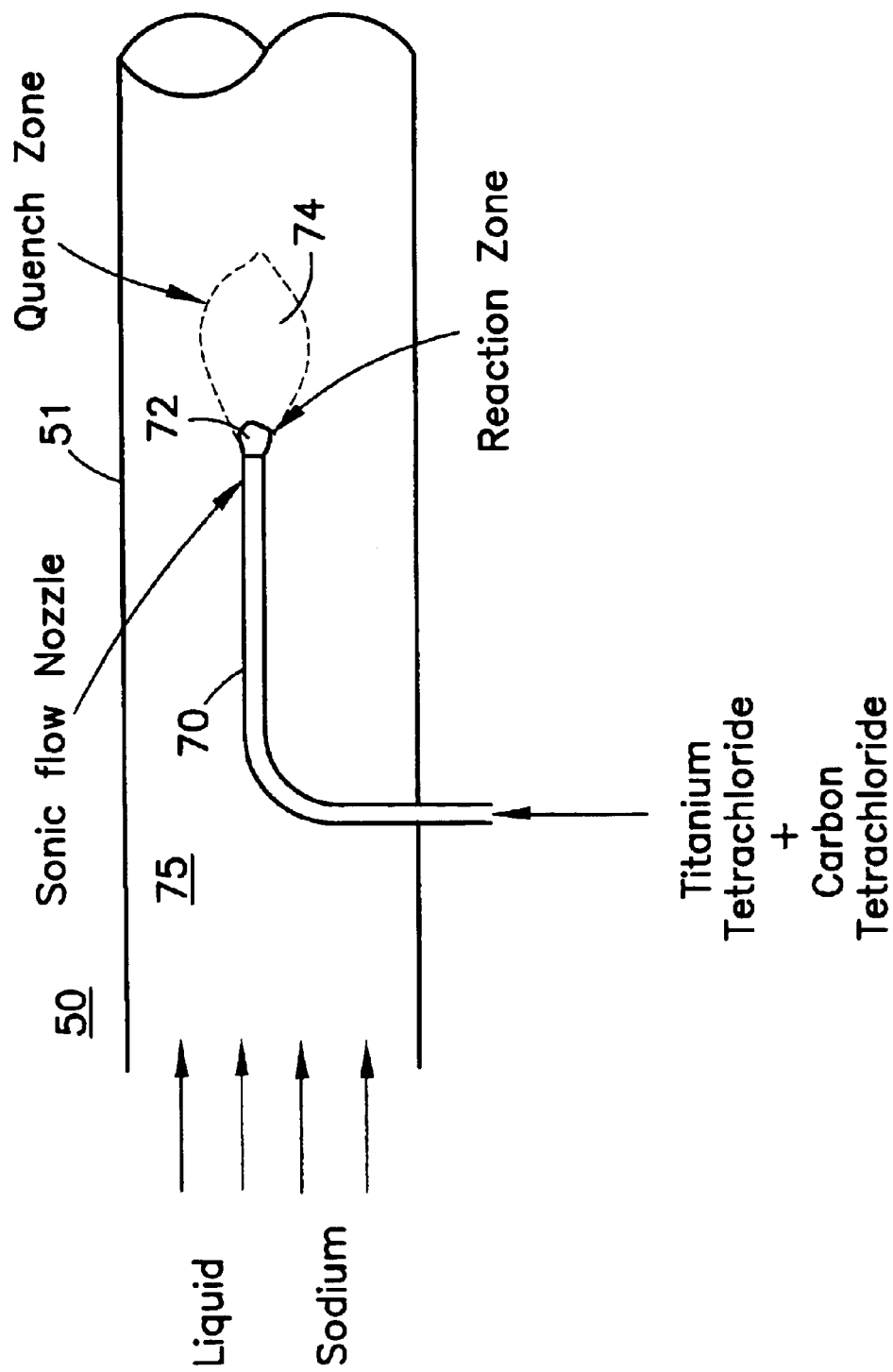
FIG. 2 is a representation of a sonic nozzle and reactor for carrying out the invention.

Referring to FIG. 1 there is shown a schematic block diagram representation of the invention in which a carbon tetrachloride boiler 20 is connected via line 23 to a mixing chamber 45. The mixing chamber 45 receives titanium tetrachloride from a boiler 40 through a line 43. In the mixing chamber 45, an apparatus such as a fan (not shown) mixes the two gases which then exit the mixing chamber through a line 46 and enter a reactor 50. The mixing chamber 45 may not require a fan or other means for obtaining a predetermined ratio of gases may be used. In the reactor 50 there is present liquid sodium which enters the reactor through a line 58 and a sonic nozzle 70, see FIG. 2, hereinafter described, which introduces the mixed vapor of titanium tetrachloride and carbon tetrachloride submerged in a liquid sodium environment.

The reaction is exothermic and produces ceramic titanium carbide powder. All products leave the reactor 50 through an exit or outlet line 54. The reacted materials, along with unreacted and excess liquid sodium, enter a separator 80 such as a filter to separate the solids including the reaction products of titanium carbide and sodium chloride from liquid sodium, the liquid sodium leaving the separator 80 via a line 91 and the solids leaving the separator 80 through a line 85 which leads to a vacuum still 140. The vacuum still 140 draws off any entrained liquid sodium and recycles it via line 142 to a sodium pump 65 while the product or combined solids of sodium chloride and titanium carbide are transferred via line 141 to a wash station 145. The product is washed with water thereby dissolving the sodium chloride leaving behind the ceramic titanium carbide powder to exit through a line 146 as product. The wash water containing the dissolved sodium chloride can be disposed of as required.

Figure 3:
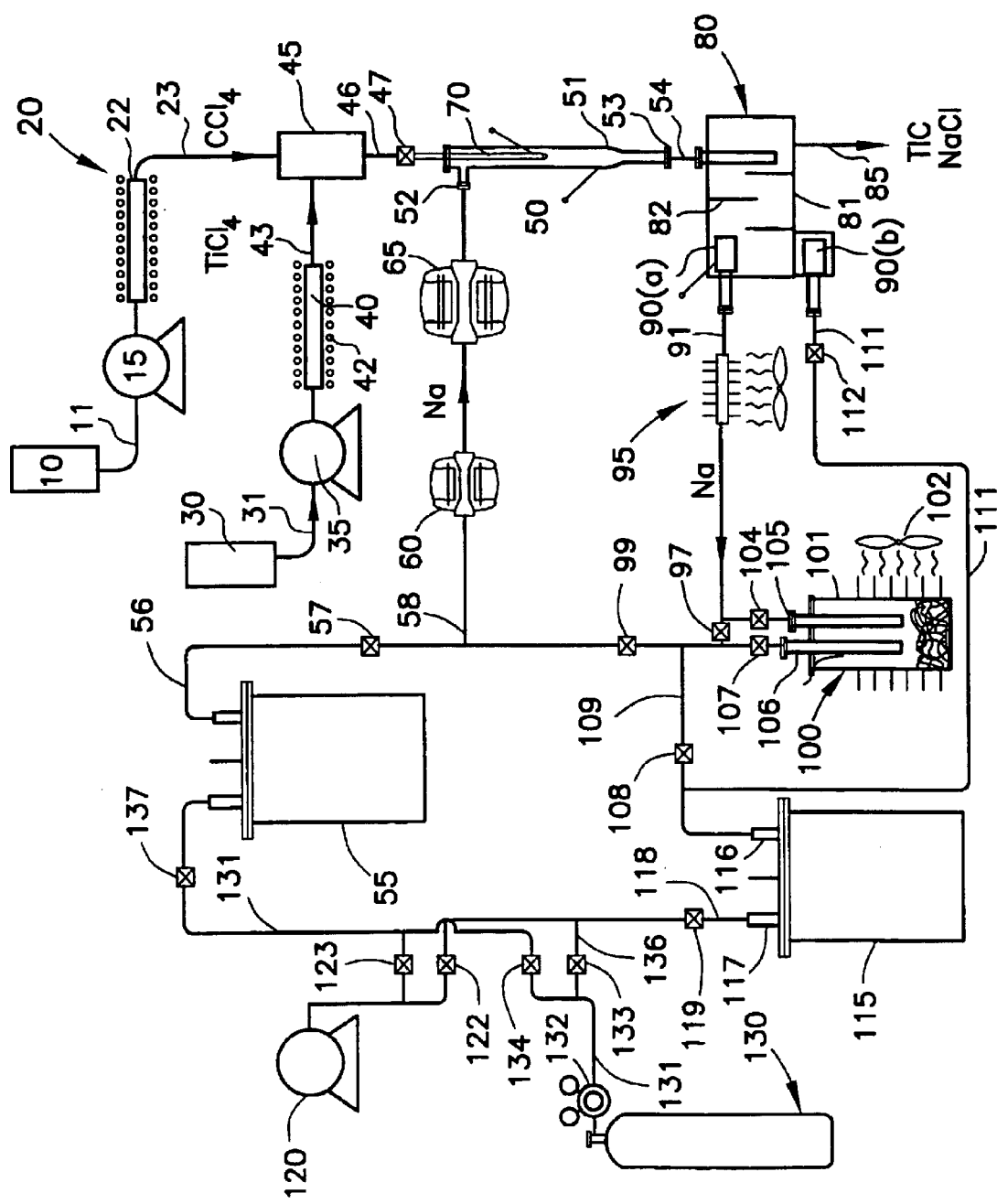
FIG. 3 is a flow diagram of a process for carrying out the invention.

Referring to FIG. 3 there is shown a more detailed engineering diagram in which a carbon tetrachloride supply 10 is connected via line 11 to a metering pump 15 and to the carbon tetrachloride boiler 20. The carbon tetrachloride boiler 20 is fundamentally a heat exchanger 22 operated at a sufficient temperature to flash carbon tetrachloride from a liquid to a gas. A line 23 transports the gaseous carbon tetrachloride from the heat exchanger or flash boiler 20 to the mixing chamber 45. Similarly, a titanium tetrachloride supply 30 is connected via line 31 to a metering pump 35 which transports the liquid titanium tetrachloride to a flash boiler 40 which is also a heat exchanger 42 operating at a temperature sufficient to convert the liquid titanium tetrachloride to vapor. The gaseous titanium tetrachloride is conducted via line 43 to the mixing chamber 45, previously described, for mixing the gaseous carbon tetrachloride and the gaseous titanium tetrachloride therein, the combined gases leaving through the line 46 and being transported through a valve 47 to the reaction chamber 50.

The reaction chamber 50 consists of a conduit 51 having a sodium inlet 52 and an outlet 53. As shown in the Figure, a sonic nozzle 70 receives the mixed gas from the line 46 leaving the mixing chamber 45 and introduces the gas into the reaction chamber 50, at conditions hereinafter to be described.

Sodium is provided from a source thereof 55, illustrated as a sodium fill sump having an exit line 56 which passes through a valve 57 and becomes line 58 passing through a sodium flow meter 60 and then through a sodium pump 65 into the reaction chamber 50. In the reaction chamber 50, as shown in more detail in FIG. 2, there is a reaction zone 72 wherein the mixed gases from the sonic nozzle 70 (and mixing chamber 45) enter the liquid sodium environment which acts as a heat sink 75. Downstream from the reaction zone 72 is a quench zone 74 denoted in broken lines. It is in the area of the reaction zone 72 that the reaction is believed to take place in the gaseous state, that is the reduction of the mixed titanium tetrachloride and carbon tetrachloride gases to the ceramic titanium carbide occurs at a very elevated temperature due to the exothermic nature of the reaction. The presence of greater than stoichiometric quantities of sodium necessary to reduce the gases to the corresponding elemental material provides a sufficient heat sink 75 and quench zone 74 such that the reaction products are quickly cooled below the sintering temperature of the titanium carbide formed and below the melting temperature of the sodium chloride formed during reaction. The rapid cooling of the reaction products below the melting point of the salt and the sintering temperature of the ceramic are important features of the present invention.

Another important feature of the present invention is that the entire system can be operated at relatively low temperatures, depending on the reducing metal employed. It is only required that the temperature of the system be greater than the melting point of the reducing metal. In the case of sodium, the system operating temperature must be greater than about 97° C., which is the approximate melting temperature of sodium. For safety sake, of course, the system will be operated at a sufficiently greater temperature than 97° C. to accommodate usual engineering fluctuations which occur in operating any system, preferably about 400° C.

Very high temperatures are not needed and are preferably avoided. This low temperature operation is also made possible by the fact that the mixed gases entering subsurface to a liquid sodium environment react completely and are reduced at the relatively low temperatures of the inventive system. In prior art systems, the constituents have to be heated to a much higher temperature to initiate a reaction, but for some reason, introducing the titanium tetrachloride and carbon tetrachloride vapor in a completely liquid sodium environment initiates the reaction at lower than expected temperatures providing all the advantages previously described.

After the reaction occurs, the reaction products are titanium carbide which is a solid particulate material at the temperatures at which the system is operated and sodium chloride which is also a particulate solid at the temperature at which the system operates and unreacted liquid sodium present in greater than stoichiometric quantities. This mixture of material leaves the reaction chamber 50 via a line 54 and is transported to a solids separator 80. The solids separator 80 has a housing 81 and contains a series of baffles 82 which permit the solids to settle out while the liquid sodium is transported to a pair of filters 90*a*, 90*b*. The solids exit the separator 80 through a line 85, and may be transferred to a wash station 145 as previously described. The sodium in the normal operation of the loop exits the solids separator 80 through the filter 90*a* via line 91 and passes through a heat exchanger 95 wherein heat is removed. As before mentioned the reaction to produce the titanium carbide is exothermic thereby adding a significant quantity of heat to the liquid sodium. It is at the heat exchanger 95 that some of this heat is removed. The cooled sodium exiting the heat exchanger 95 through line 91 passes through valves 97 and 99 and joins with the line 56 to be recycled through line 58 to the sodium flow meter 60 and the pump 65.

A cold trap 100 is provided with a housing 101 and a heat exchanger 102. The cold trap 100 is operated intermittently and is used to precipitate any oxygen which may find its way into the sodium since sodium oxide is a corrosive and unwanted material. The heat exchanger 102 is operated at parameters sufficient to reduce the temperature of the liquid sodium to the point where sodium oxide precipitates. The cold trap 100 has a valve 104 intermediate line 91 and the cold trap inlet 105. A valve 107 intermediate cold trap outlet 106 and line 91 isolates the cold trap 100 from the normal recycle of sodium through the reactor 50 and the solids separator 80.

The filter 90(*b*) in the solids separator 80 is used only intermittently and when the system is to be drained. The filter has an outlet line 111 leading to a valve 112. Line 111 joins line 109 between a valve 108 and inlet 116 of a drain sump 115. The drain sump 115 is sued, as is obvious to those of ordinary skill in the art, to drain the system for clean-up and maintenance. A vacuum pump 120 is connected through line 118 and valves 122 to drain sump 115, thereby providing the necessary vacuum to the system. The vacuum 120 is also connected through valves 123, 134 and 137 to a line 131 connecting a source of inert gas 130 such as helium or argon and the fill sump 55. Line 131 passes through a flow meter 132. A valve 133 in line 136 connects line 131 with line 118 exiting from the drain sump 115. Accordingly, the fill sump 55 which stores make-up sodium for the system is under an inert gas atmosphere maintained at a pressure determined by the vacuum pump 120.

The operation of the system has been described in general but the reactor 50 may be a 10 cm stainless steel vessel while the heat exchanger 22 and 42 may be constructed of materials and of a design known to persons of ordinary skill in the art. The mixed gas which flows from the mixer 45 into the reactor 50 by means of the sonic nozzle 70 flows at a pressure which is controlled by the boiler temperatures heating the feeds until the vapor pressures of the inorganic feeds exceed the critical pressure ratio as determined by the ambient pressure of the reactor 50. The ambient pressure of the reactor 50 is determined by the vacuum pump 120. The nozzle 70 may have (by way of example only) a diameter of 1 cm and positioned within a 5 cm diameter reaction vessel) 50 so that the gas is completely submerged within the liquid sodium medium. All parts of the apparatus in contact with the inorganic vapors from boilers 20 and 40 must be maintained above the temperature which gives a vapor pressure of both inorganic feeds greater than the critical pressure ratio by suitable heat tracing of the various connecting pipes and control valves, all as is well known in the engineering art. It is imperative, for safety purposes, that the mixed gas flowing through the nozzle 70 into the liquid sodium environment is at greater than sonic velocity.

Accordingly, it is preferred that the vapor be between two atmospheres and about ten atmospheres of pressure in order to ensure that the velocity of the mixed gas is greater than the sonic velocity. By operating at greater than sonic velocity, it is ensured that the sodium does not back up into the nozzle 70 thereby possibly clogging the nozzle but also possibly creating a dangerous environment in which an explosion could occur.

Preferably the sodium is maintained at less than about 600° C. It is understood that because of the exothermic nature of the reaction, that the reaction zone 72 and portions of the quench zone 74 will be at temperatures greater than the operating temperatures of the system. Nevertheless, because of the excess of liquid sodium (or other reducing metal) with respect to the stoichiometric quantities necessary to reduce the titanium tetrachloride and carbon tetrachloride, the quenching action is so rapid that the formed titanium carbide particles do not sinter. This is not to say that the formed titanium carbide particles do not at some instant in time have a temperature greater than the sintering temperature, that is particles may be formed at a temperature in excess of the titanium carbide sintering temperature but they are rapidly quenched to a temperature below the sintering temperature while at the same time being transported downstream due to the flow of sodium past the nozzle 70. It is the combination of this excess of sodium having a high heat capacity along with the flow and mixing generated by the reaction which prevents the titanium carbide particles from sintering to any significant degree which is a major aspect of the present invention. The reaction zone 72 and the quench zone 74 are shown for purposes of illustration only and do not represent an accurate determination of how far downstream the zones extend.

Although the example given refers to titanium carbide as the product, it should be understood that a variety of ceramics can be made by the subject invention. Most preferably, volatile liquid compounds such as the halides of titanium, tantalum, zirconium, silicon and aluminum may be combined with one or more of various halides of carbon, boron, silicon, sulfur and/or various other gaseous compounds, such as $C_2N_2$ or others in order to provide single or mixed ceramics. As before stated, mixed compounds such as cyanogen ($C_2N_2$) may be used as a feedstock alone or in combination with other sources of non-metallics to provide mixed carbide and nitride ceramics, while other non-metal constituents, such as boron, silicon and sulfur, may be used to provide a variety of ceramics. In separating the produced salt, distillation is probably preferred to water washing, but this is within the skill of the relevant art.

While there has been disclosed what is considered to be the preferred embodiment of the present invention, it is understood that various changes in the details may be made without departing from the spirit, or sacrificing any of the advantages of the present invention.

We claim:

1. A method of producing a ceramic formed of a metal constituent and a non-metal constituent from a metal salt of the metal constituent and a compound of the non-metal constituent, comprising introducing a metal salt of the metal constituent in the vapor phase and a compound of the non-metal constituent in the vapor phase into a liquid alkali metal or a liquid alkaline earth metal such that ceramic is formed from the metal constituent and the non-metal constituent within a liquid metal environment.

2. The method of claim 1, wherein the metal constituent is selected from the group consisting of Ti, Al, Zr, Ta, Si and mixtures thereof.

3. The method of claim 2, wherein the non-metal constituent is selected from the group consisting of C, B, N, S, Si and mixtures thereof.

4. The method of claim 3, wherein the ceramic is produced continuously.

5. The method of claim 3, wherein the liquid alkali metal or alkaline earth metal is substantially maintained at a temperature less than about 400° C. during production of the ceramic.

6. The method of claim 3, wherein the metal salt is a halide.

7. The method of claim 3, wherein the metal salt is a chloride.

8. The method of claim 6, wherein the liquid alkali metal is Na, K or mixtures thereof.

9. The method of claim 6, wherein the liquid alkaline earth metal is Ca, Ba, Mg or mixtures thereof.

10. The method of claim 3, wherein the liquid alkali metal is Na and the liquid alkaline earth metal is Mg and the metal halide is a chloride.

11. The method of claim 1, wherein the compound of the non-metal constituent contains carbon to produce a ceramic carbide.

12. The method of claim 1, wherein the compound of the non-metal constituent contains boron to produce a ceramic boride.

13. The method of claim 1, wherein the compound of the non-metal constituent contains nitrogen to produce a ceramic nitride.

14. The method of claim 1, wherein the compound of the non-metal constituent contains both carbon and boron.

15. The method of claim 1, wherein the compound of the non-metal constituent is $C_2N_2$.

16. The method of claim 1, wherein the compound of the non-metal constituent contains silicon to produce a ceramic silicide.

17. The method of claim 1, wherein the compound of the non-metal constituent contains sulfur to produce a ceramic sulfide.

18. The method of claim 1, wherein the ceramic is formed in the presence of excess liquid metal.

19. The method of claim 1, wherein the metal constituent is selected from the group consisting of Ti, Al, Zr, Ta, Si and mixtures thereof; the non-metal constituent is selected from the group consisting of C, B, N, Si, S and mixtures thereof; the metal salt is a halide; the liquid alkali metal is Na, K, or mixtures thereof, and the liquid alkaline earth metal is Ca, Mg or mixtures thereof.

20. The method of claim 19, wherein the metal salt and non-metal constituent are introduced into the liquid in the vapor phase at a pressure in the range of from about 2 to about 10 atmospheres.

21. The method of claim 19, wherein the metal salt and non-metal constituent are introduced into the liquid metal in the vapor phase at a velocity not less than the sonic velocity of the vapor.

22. A method of continuously producing a non-oxide ceramic formed of a metal constituent and a non-metal constituent, comprising introducing a salt of the metal constituent in the vapor phase and a compound of the non-metal constituent in the vapor phase into a liquid alkali metal or a liquid alkaline earth metal or mixtures thereof to react the vapor constituents with liquid metal subsurface of the liquid metal to form ceramic particles, the liquid metal being present in excess of the stoichiometric amount necessary to convert the constituents into ceramic particles to absorb sufficient heat of reaction to prevent the ceramic particles from sintering, separating the ceramic particles from the excess liquid metal and recycling unused liquid alkali metal or liquid alkaline earth metal.

23. The method of claim 22, wherein the salt of the metal constituent in the vapor phase and the compound of the non-metal constituent in the vapor phase are mixed in the vapor phase and thereafter introduced into the liquid metal at a velocity not less than the sonic velocity of the mixed vapor.

24. The method of claim 23, wherein the mixed vapor is introduced into the liquid metal at a pressure in the range of from about 2 atmospheres to about 10 atmospheres.

25. The method of claim 4, wherein the vapor constituents are diluted with an inert gas.

26. The method of claim 22, wherein the liquid metal is flowing in a stream and the metal constituent vapor with the non-metal constituent vapor are introduced subsurface into the steam of liquid metal.

27. The method of claim 26, wherein the salt of the metal constituent and the compound of the non-metal constituent are introduced into the flowing stream of liquid metal as a vapor having a velocity not less than the sonic velocity of the vapor.

28. The method of claim 27, wherein the liquid metal is Na.

29. The method of claim 26, wherein the metal constituent is selected from the group consisting of Ti, Al, Zr, Ta, Si and mixtures thereof and the non-metal constituent is selected from the group consisting of C, B, N, Si, S and mixtures thereof.

30. The method of claim 29, wherein the salt of the metal constituent is a halide and the liquid metal is an alkali metal.

31. The method of claim 30, wherein the compound of the non-metal constituent is $CCl_4$.

32. The method of claim 30, wherein the compound of the non-metal constituent is $BCl_3$.

33. The method of claim 30, wherein the compound of the non-metal constituent is a combination of C and N.

34. The method of claim 30, wherein the compound of the non-metal constituent contains nitrogen.

35. The method of claim 30, wherein the compound of the non-metal constituent contains silicon.

36. The method of claim 30, wherein the compound of the non-metal constituent contains S.

* * * * *